United States Patent

[11] 3,614,542

| [72] | Inventor | Jan R. Coyle |
| | | 514 E. Ghent, San Dimas, Calif. 91773 |
| [21] | Appl. No. | 752,551 |
| [22] | Filed | Aug. 14, 1968 |
| [45] | Patented | Oct. 19, 1971 |

[54] LIQUID-ACTIVATED SYSTEM
18 Claims, 4 Drawing Figs.

[52] U.S. Cl.................................................. 317/151,
102/70.2, 307/118, 317/DIG. 3
[51] Int. Cl...................................................... F42b 9/08,
H01h 47/00
[50] Field of Search............................................ 317/151;
307/118; 328/1; 244/150; 102/16, 70.2

[56] References Cited
UNITED STATES PATENTS
| 3,339,578 | 9/1967 | Smith............................ | 317/123 PL |
| 3,395,640 | 8/1968 | Taylor........................... | 102/16 |
| 2,892,128 | 6/1959 | Wolf.............................. | 317/151 X |
| 3,059,814 | 10/1962 | Poncel et al. ................. | 244/149 X |
| 3,343,493 | 9/1967 | Aulds et al..................... | 102/70.2 |

*Primary Examiner*—Lee T. Hix
*Attorney*—Newton H. Lee, Jr.

ABSTRACT: A liquid-activated system in which a load circuit includes a capacitor discharged upon immersion of electrodes in liquid.

Such a system in which a separate capacitor is discharged upon immersion of the electrodes in a liquid to close the load circuit and allow discharge of its capacitor.

Such a system in which the immersion of the electrodes in a liquid causes the initial discharge of the load circuit capacitor to close a load circuit relay.

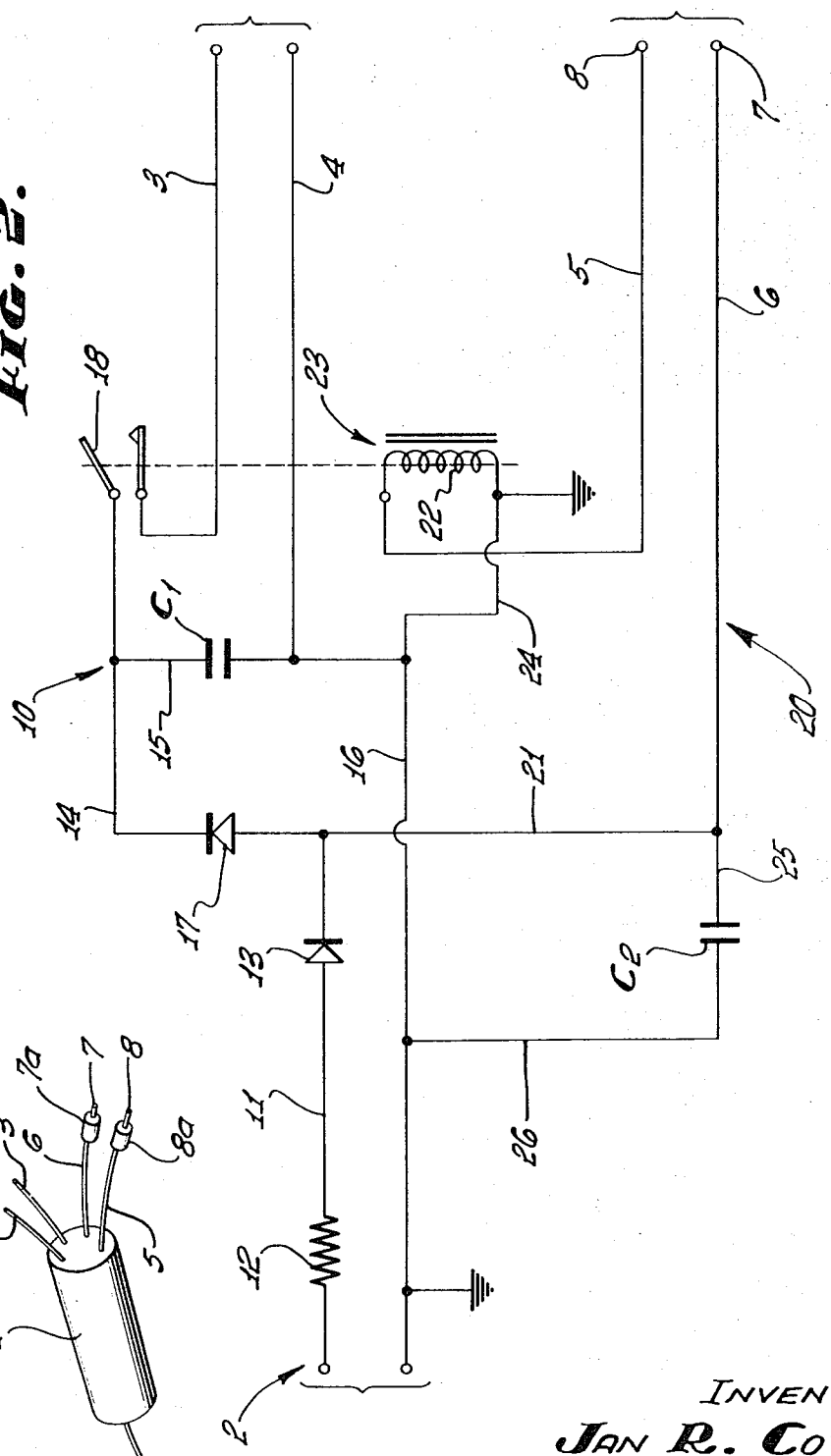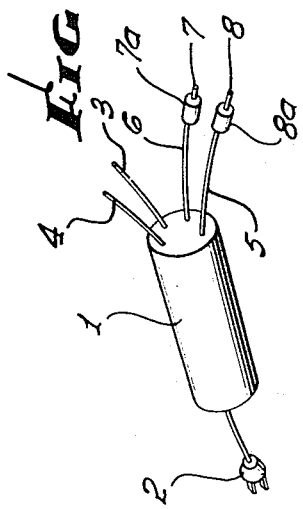

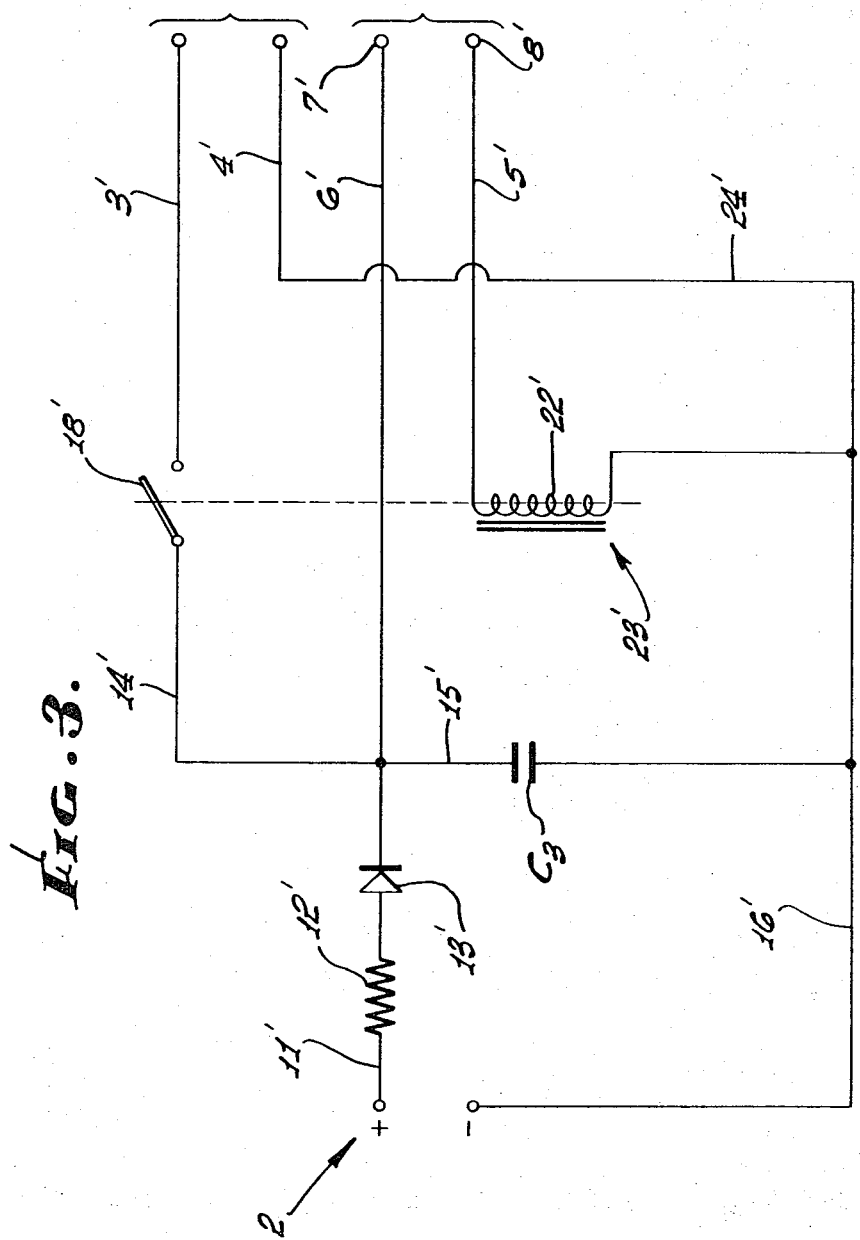

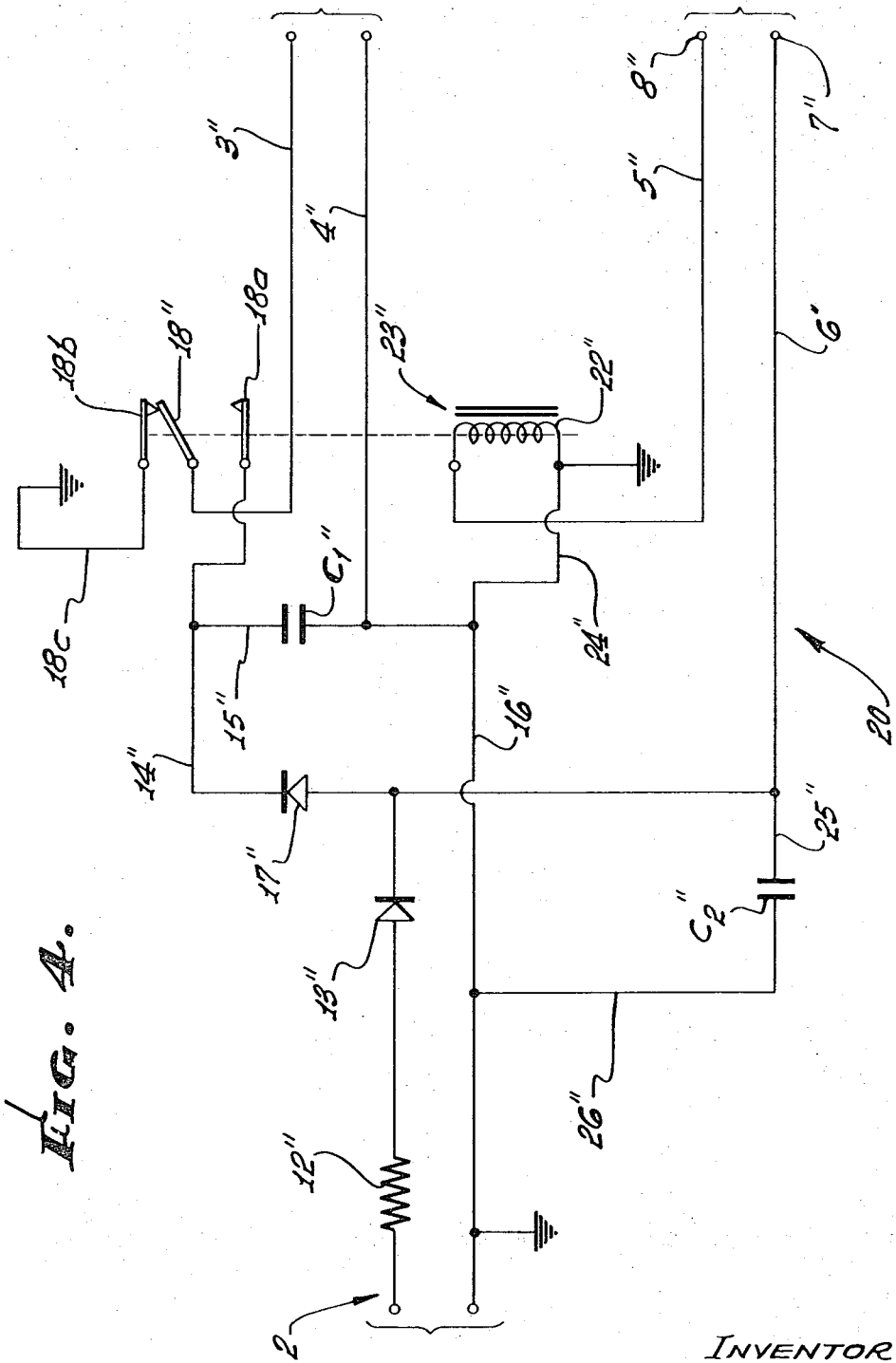

3,614,542

LIQUID-ACTIVATED SYSTEM

BACKGROUND OF THE INVENTION

In various circumstances there has long been a need for an electrical system for operating a load with certainty, notwithstanding the exposure of the system to the deleterious effects of environment which may be destructive of the operability of the system.

An example of such a need is the release of a parachute or canopy release mechanism which, when the parachutist lands in the water, will be instantaneously released without requiring that the parachutist manually disengage the release mechanism. Likewise, there has been a need for a system that is capable of initiating the inflation of flotation equipment adapted to maintain the parachutist afloat on the water without requiring that he manually initiate the inflation of the flotation equipment. Another need arises in the initiation of the operation of a signal generator, whereby the location of a downed parachutist may be ascertained so that his rescue may be effected.

Simple storage battery-operated systems have not proved to be satisfactory due to the variable shelf life of the batteries and the lack of certainty of systems energized thereby. In general, moreover, the systems heretofore available have been susceptible of deterioration when exposed to the humidity and salt air.

As a consequence of the inefficiency of the systems for initiating release of canopy buckles and for initiating the operation of other safety equipment, serious losses of personnel have occurred; for example, when a pilot or a member of a crew must eject from an aircraft over a body of water.

SUMMARY OF THE INVENTION

The present invention provides a system which is certain in its operation and which is initiated in response to immersion in a body of water.

In addition, the present invention provides a system for energizing a load circuit, such as a circuit for firing a squib capable of effecting the release of a canopy buckle or effecting the operation of other devices, the system being insensitive to its environment prior to immersion in a body of water and, more particularly in this connection, being insensitive to variable conditions such as storage time or exposure to moisture.

In general, the invention provides a system for energizing a load circuit which is initially open and which contains a passive source of stored current in combination with normally open switch means adapted to be actuated by immersion of a pair of electrodes in a conductive liquid. More particularly, the source of stored current may be initially energized or charged, for example, upon ejection of a pilot from an aircraft, or, the stored current source may be periodically energized or charged by a wearer of safety equipment. For example, the stored current source may comprise a capacitor in the normally open load circuit and the capacitor may be charged by the connection of the system to either the normal 28-volt electrical system of present day military aircraft or by a source of 115 volts, to which the system of the invention may be either periodically or continuously connected so as to maintain a charge on the capacitor. In such a system the normally open load circuit is closed by a switch mechanism actuated by immersion of electrodes in water to discharge the capacitor into the load circuit. Accordingly, a pilot or flight crewman may have such a system in accordance with the invention embodied in his safety gear for effecting the release of his canopy buckle, if necessary, and for the initiation of the functioning of the various other safety equipment, the system being plugged into the aircraft's electrical system to maintain the charge on the capacitor until the instant of ejection from the aircraft. As another example, a crewman on an aircraft carrier might periodically plug the system into the vessel's electrical system to charge the capacitor for a period of time. In either event, immersion of the electrodes for controlling the system in the water will initiate the discharge of the capacitor into the load circuit, but otherwise the capacitor is conductively isolated from the load circuit by the normally open switch, so that the maintenance of the capacitor charge for a sufficient period, for example, to allow decent of a parachutist.

While the examples and background set forth above relate to various emergency uses of the system of the invention, it will be appreciated by those skilled in the art that the system will have other applications where the stored current circuit is impassive and is operable only following immersion of control electrodes in a conductive liquid.

BRIEF DESCRIPTION OF THE DRAWINGS

FIG. 1 is a view in perspective illustrating a conductive fluid-activated switch mechanism made in accordance with the invention;

FIG. 2 is a schematic illustration of one embodiment of a conductive liquid-activated system embodying the invention;

FIG. 3 is a schematic illustration of another system; and

FIG. 4 is a schematic illustration of still another system embodying the invention.

DESCRIPTION OF THE PREFERRED EMBODIMENTS

Referring first to FIG. 1, there is illustrated a device exemplary of a physical embodiment of the invention. This device includes a body 1 which may be composed of suitable plastic material so as to be lightweight and waterproof. The body 1 has a plug 2 adapted to be plugged into an electrical outlet, such as an outlet from the usual aircraft electrical system, the electrical system of a ship, or other electrical system. Leading from the body 1 are load conductors 3, 4 and control conductors 5 6. At the end of each control conductor 5, 6 is an electrode, respectively designated 7, 8, these electrodes being potted in an insulating grommet 7a, 8a and being exposed at their outer ends for immersion in a conductive liquid. The insulating grommets enable the mounting of the electrodes in suitably spaced relation, for example in the parachute harness of an aircraft pilot, a crewman, or in the flotation equipment of a deckhand on a ship, or otherwise, the grommets preventing inadvertent loss across the electrodes due to moisture in the harness or other equipment, due to perspiration, or other uncontrollable circumstances.

In accordance with the invention, the plug 2 is employed to charge the device from a source, as referred to above, the load conductors being connected to an actuator such as a squib so as to effect release of a canopy buckle, inflation of flotation equipment, or operation of a signal beacon, or otherwise, only when the electrodes 7, 8 are immersed in a body of conductive liquid, such as the sea, for example.

Referring to FIG. 2, one system is illustrated having the plug 2 adapted for connection to a source of a charging voltage, the load conductors 3 and 4, and the conductors 5 and 6 having the electrodes 7, 8 at their outer or free ends.

This system includes an initially open circuit 10 connectable with the load. The circuit 10 includes a conductor 11 leading from the source plug 2 and having a resistance 12 therein, and at least one diode 13. Connected to the conductor 11 is a lead 14 having a branch lead 15 connected to a ground conductor 16 which returns to the plug or source 2. In the branch conductor 15 is a capacitor C1 of a suitable value, depending upon the application of the system, that is, the nature or current requirement of the load. In the lead 14 may be another diode 17. The load conductor 3 leads from conductor 14 at one side of the capacitor C1, and the load conductor 4 leads from the load to the ground conductor 16 at the other side of the capacitor C1. In the load conductor 3 is a normally open switch 18 which conductively isolates the capacitor C1 from the load, whereby the charge will be maintained on the capacitor for a long period of time. This assures that the load circuit will be sufficiently energized to accomplish the desired electrical function, such as the firing of a squib. The maintenance of the charge on the capacitor C1, for example, in the case of a parachute release system, assures that the release will be operated, notwithstanding that the parachutist may be suspended in the parachute for a substantial period of time before reaching the water.

Accordingly, when the plug or source conductors 12 and 16 are connected to a source of electricity, the capacitor C1 will be charged, the resistor 12 limiting the initial surge current supplied to the capacitor C1, and the diodes 13 and 17 preventing bleeding off of the charge on the capacitor back through the plug 2 when it is disconnected from the charging source. However, the charge impressed on the capacitor C1 cannot discharge to the load circuit 34 until the normally open switch 18 has been closed.

This switch 18 is under the control of a conductive liquid activated circuit generally denoted at 20. This circuit 20 includes a branch conductor 21 leading from the source conductor 2 and connected with the conductor 6 described above having the electrode 7 at its outer end. The electrode 8 and the conductor 5, to which the electrode 8 is connected, are in circuit with the coil winding 22 of a relay generally denoted at 23, which relay includes the switch 18 previously described, the relay coil winding 22 being connected by a conductor 24 to the ground conductor 16 leading back to the plug or source 2. In a branch conductor 25 leading from the conductor 21 is a second capacitor C2 having a ground connection 26 with the ground conductor 16 leading to the source or plug 2.

Thus it is apparent that when the plug 2 is connected to an electrical source not only is the capacitor C1 charged but also the capacitor C2 is charged, the resistance 12 also limiting the initial surge current supplied to the capacitor C2, and the diode 13 preventing the bleeding off of the charge from the capacitor C2 when the plug or source 2 is disconnected.

Accordingly, the circuit 20 will remain inactive until such time as the electrodes 7 and 8 are virtually immersed in an electroconductive fluid, and so long as the circuit 20 is inactive the relay switch 18 will remain open, rendering the load circuit 10 inactive. However, immersion of the electrodes 7 and 8 will complete the circuit 20, the charge impressed upon the capacitor C2 actuating the relay 23 to close the switch 18. Whereupon, the charge impressed on the capacitor C1 will be applied to the load through the conductors 3, 4.

It will be noted that the circuits 10 and 20 of FIG. 2, being essentially isolated from one another in respect of the electrical source for energizing the same, that is, the capacitors C1 and C2 being in separate circuits, the full charge of the capacitor C1 is available to energize the load and the full charge of the capacitor C2 is available to energize the relay 23 in order to complete the circuit 10. Thus, even though the plug 2 may be separated from a source of electricity for a substantial period of time, the capacitor C1 will be capable of maintaining sufficient charge to energize the load.

Referring to FIG. 3, a modification of the system is illustrated which does not have separate capacitors in the control and operating circuits as in the first-described system, but which is, nevertheless, advantageous where smaller load requirements are encountered or where space limitations enable the utilization of a larger capacitor.

In the system of FIG. 3 the plug or source connection 2, as in the previously described embodiment, leads to a conductor 11' in which is a resistance 12' and a diode 13'. Leading from the conductor 11' is a branch conductor 14' and another branch conductor 15' which leads to a ground conductor 16'. In the conductor 15' is a capacitor C3. Interposed between the conductor 14' and the load conductor 3' is a normally open switch 18'. The other load conductor 4' leads through a conductor 24' to the ground conductor 16' and thence to the source or plug 2. A coil winding 22' of the relay generally denoted at 23' is connected to the conductor 24' and to the conductor 5' having the electrode 8' at its outer end. The other electrode 7' is connected to the source conductor 11' by the electrode conductor 6'.

In this system it may be noted that the capacitor C3 will be charged upon connection of the plug 2 to a source, but the normally open switch 18' prevents energization of the load circuit 3', 4' until such time as the electrodes 7' and 8' are immersed in a conductive fluid, whereby to complete the circuit from the capacitor C3 to the coil winding 22' of the relay 23', thereby closing the switch 18'. Whereupon, the capacitor C3 will energize the load circuit 3', 4'.

While in the illustrative embodiments described above relays having normally open switches and coil windings have been illustrated and are the significant point being that the circuitry is passive until such time as the electrodes are immersed in a conductive liquid, and the system may be continuously maintained charged by connection of the plug 2 to a source of electrical energy, or the system may be periodically charged by temporarily connecting the source plug 2 to a battery or other source of electrical energy. In any event, when the plug is pulled from the source, the capacitors will be charged and will retain such charge for a sufficient period of time to maintain the efficiency of the system until the electrodes are immersed.

As examples of the foregoing, an aircraft pilot or crewman may eject from an aircraft in his parachute, thereby pulling the plug 2 from the aircraft's electrical source, and the system will remain energized until the parachutist lands in the water, at which time the system will be instantaneously energized and either the capacitor C1 of FIG. 2 or the capacitor C3 of FIG. 3 will supply the necessary electrical energy to, for example, effect release of the parachutist's canopy buckle. A canopy buckle susceptible of such release is illustrated in the application for letters patent filed concurrently herewith, Ser. No. 722,969, entitled AUTOMATIC CANOPY BUCKLE. On the other hand, the capacitor C1 of FIG. 2 or the capacitor C3 of FIG. 3 may also supply or be separately connected with flotation equipment for such a parachutist or for a crewman working on the derrick of a ship at sea. Likewise, such a system is useful in the initiation of the operation of a signal beacon. Obviously, other uses may be made of the normally passive water or other electrode conductive fluid-activated circuits.

Referring now to FIG. 4, another system is shown which, in general, corresponds to the system illustrated in FIG. 1, the corresponding elements having the same reference numbers in the double-primed series. However, in the embodiment of FIG. 4, provision is made for grounding the load while the conductive fluid activated circuit 20'' is passive and while the switch 18'' is open between the conductor 14'' and the load conductor 3''. More particularly, the switch 18'' is seen to be in engagement with a contact 18b which is grounded by a conductor 18c. Moreover, the switch 18'' is connected to the positive side of the load circuit, that is, connected to the conductor 3'' so that this conductor is grounded via the switch 18'' and the conductor 18c. The other side of the load circuit, that is, conductor 4'', is grounded as previously described via the conductor 16''.

When the system is activated by immersion of the electrodes 7'', 8'' in a conductive fluid, the switch 18'' will be caused to shift by the relay coil 22'' into engagement with the contact 18a, completing the circuit between the conductor 14'' and the load conductor 3'' and breaking the short circuit or ground connection through the conductor 18c.

Under these circumstances it will be appreciated that the system is advantageously adapted for utilization with load circuits involving, for example, pyrotechnic devices such as the squibs of safety flotation equipment or canopy releases. More particularly, the normal grounding of the load circuit as shown in FIG. 4 prevents accidental energization of the load circuit by stray electrical energy, such as may be imposed on the load circuit by radar systems. The load circuit is rendered incapable of energization until such time as the relay 23'' is energized by the charge discharged from the capacitor in circuit with the fluid-activated electrodes, following which the charge in the capacitor in the normally open circuit between the capacitor and the load circuit may discharge to the load.

Means for normally grounding the load circuit are herein illustrated and described only in combination with the two capacitor system corresponding to that of FIG. 2, but it will be

I claim:

1. In a conductive liquid responsive system for energizing a load circuit: an initially open circuit connectable with the load, capacitor means providing a stored electrical charge in said initially open circuit, and conductive liquid-activated electrically operated switch means having normally open contacts conductively isolating said capacitor means in said circuit from said load for holding the charge on said capacitor means and for closing said initially open circuit including a pair of electrodes in circuit with said switch means to close said contacts of said switch means upon immersion of said electrodes in a conductive liquid.

2. A system as defined in claim 1, wherein said conductive liquid activated switch means includes capacitor means providing a second stored electrical charge for closing said normally open switch means responsive to immersion of said electrodes.

3. A system as defined in claim 1, wherein said conductive liquid-activated switch means is connected with said capacitor means providing a stored electrical charge and closed thereby responsive to immersion of said electrodes.

4. A system as defined in claim 1, including means connectable to a source of electrical energy for charging said capacitor means, and means for preventing bleeding off of the charge on said capacitor means upon disconnection from said source to further conductively isolate said capacitor means in said initially open circuit.

5. A system as defined in claim 1, wherein said capacitor means providing a stored electrical charge comprises a first capacitor, said circuit of said conductive liquid-activated switch means having a second capacitor for energizing said latter circuit responsive to immersion of said electrodes.

6. A system as defined in claim 1, wherein said circuit of said conductive liquid-activated switch means is connected with said capacitor means for closing said switch means responsive to immersion of said electrodes.

7. In a system for energizing a load: a passive circuit connectable to the load including a switch having normally open contacts, a capacitor in said circuit and conductively isolated from said load by said open switch contacts, means for connecting said capacitor to a source of electrical energy to charge the capacitor, and electrically operated means for closing said switch contacts including means immersible in a conductive liquid, whereby the charge on said capacitor will discharge to the load.

8. A system as defined in claim 7, wherein said electrically operated means includes a second passive circuit having a second capacitor therein connected to said means for connecting the first-mentioned capacitor to said source of electrical energy, said means immersible in a conductive liquid including a pair of electrodes in circuit with said second capacitor.

9. A system as defined in claim 7, wherein said electrically operated means is in circuit with said capacitor and with said means immersible in a conductive liquid, said latter means comprising a pair of electrodes.

10. A device for energizing a load upon immersion of the device in a conductive liquid, comprising a body providing an electrical connection to an electrical source, a pair of conductors leading from said body and connectable to a load, a pair of electrodes leading from said body, capacitor means providing a stored electrical charge in said body and chargeable responsive to connection of said connection to said source, and normally passive means in said body including a normally open switch relay actuatable by said stored electrical charge responsive to immersion of said electrodes in a conductive liquid to energize said relay and close said switch to connect said means providing a stored electrical charge to said pair of conductors.

11. A device as defined in claim 10, wherein said electrodes include insulators disposed about said electrodes and exposing only end portions of said electrodes.

12. In a system for energizing a load circuit: an initially open circuit connectable with the load, capacitor means providing a stored electrical charge in said initially open circuit, and normally open conductive liquid activated switch means having open contacts normally conductively isolating said capacitor means from said load for closing said initially open circuit including a pair of electrodes immersible in a conductive liquid, said system also including means for grounding both sides of said load circuit when said initially open circuit is open and breaking the ground before said initially open circuit is closed.

13. A system as defined in claim 12, wherein said means for grounding said load circuit includes a ground conductor connected to said switch means and disconnected therefrom upon immersion of said electrodes.

14. A system as defined in claim 12, wherein said capacitor means providing a stored electrical charge comprises a first capacitor, said conductive liquid-activated switch means including a second circuit for closing said switch and having a second capacitor for energizing said second circuit responsive to immersion of said electrodes, and said means for grounding said load circuit includes a ground conductor connected to said switch means between said first capacitor and said load circuit and disconnected from said switch means upon energization of said second circuit.

15. A conductive liquid-activated passive system comprising circuit means including a control circuit and an operating circuit connectable to a source of electricity and to a load, capacitor means in said circuit means, a relay having a coil in said control circuit and a normally open switch in said operating circuit between said load and said capacitor and isolating said capacitor means from the load, and a pair of electrodes in circuit with said capacitor means and with said coil for energizing said coil in response to immersion of said electrodes in a conductive liquid, to close said switch and connect said capacitor means to the load.

16. A system as defined in claim 15, wherein said capacitor means includes a first capacitor in said control circuit to energize said relay, and a second capacitor in said operating circuit to energize said load.

17. A system as defined in claim 15, wherein said capacitor means comprises a capacitor connected to both of said circuits.

18. A system as defined in claim 15, including means grounding both sides of said load circuit comprising a normally closed switch contact in said relay opened upon energization of said coil.